(12) United States Patent
Tsurutani et al.

(10) Patent No.: US 11,491,891 B2
(45) Date of Patent: Nov. 8, 2022

(54) PRESENTATION DEVICE, PRESENTATION METHOD, AND STORAGE MEDIUM

(71) Applicant: HONDA MOTOR CO., LTD., Tokyo (JP)

(72) Inventors: Taisuke Tsurutani, Wako (JP); Taisuke Kurachi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 439 days.

(21) Appl. No.: 16/579,908

(22) Filed: Sep. 24, 2019

(65) Prior Publication Data

US 2020/0101864 A1 Apr. 2, 2020

(30) Foreign Application Priority Data

Oct. 1, 2018 (JP) .............................. JP2018-186555

(51) Int. Cl.
*B60L 58/12* (2019.01)
*B60K 37/02* (2006.01)
(Continued)

(52) U.S. Cl.
CPC .............. *B60L 58/12* (2019.02); *B60K 37/02* (2013.01); *B60K 2370/1534* (2019.05);
(Continued)

(58) Field of Classification Search
CPC .......... B60L 58/12; B60L 53/16; B60L 53/18; B60L 53/20; B60L 2240/545;
(Continued)

(56) References Cited

U.S. PATENT DOCUMENTS

| 2004/0024502 A1* | 2/2004 | Squires | ..................... B60L 3/12 |
| | | | 701/2 |
| 2005/0113988 A1* | 5/2005 | Nasr | ....................... B60L 15/06 |
| | | | 701/2 |

(Continued)

FOREIGN PATENT DOCUMENTS

| CN | 103201133 | 7/2013 |
| CN | 107757391 | 3/2018 |

(Continued)

OTHER PUBLICATIONS

Japanese Office Action for Japanese Patent Application No. 2018-186555 dated May 26, 2020.

(Continued)

*Primary Examiner* — Richard M Camby
(74) *Attorney, Agent, or Firm* — Amin, Turocy & Watson, LLP

(57) ABSTRACT

A presentation device includes an acquirer configured to acquire a usage status of a secondary battery which is the usage status of a secondary battery with which a plurality of vehicles including a target vehicle are equipped and includes one or more items, a deriver configured to derive representative values of items of the secondary battery in a vehicle in a predetermined area, and a presenter configured to present a relationship of items of the usage status of a secondary battery with which the target vehicle is equipped with respect to the representative values derived by the deriver.

9 Claims, 6 Drawing Sheets

(51) Int. Cl.
  *H04W 4/40* (2018.01)
  *B60L 53/20* (2019.01)
  *B60L 53/16* (2019.01)
  *B60L 53/18* (2019.01)

(52) U.S. Cl.
  CPC .... *B60K 2370/171* (2019.05); *B60K 2370/52* (2019.05); *B60K 2370/5899* (2019.05); *B60K 2370/592* (2019.05); *B60L 53/16* (2019.02); *B60L 53/18* (2019.02); *B60L 53/20* (2019.02); *B60Y 2200/91* (2013.01); *B60Y 2200/92* (2013.01); *B60Y 2300/00* (2013.01); *H04W 4/40* (2018.02)

(58) Field of Classification Search
  CPC ......... B60L 2240/547; B60L 2240/549; B60L 2240/70; B60L 2250/10; B60L 2250/16; B60L 2260/50; B60L 58/16; B60L 58/10; B60L 53/14; B60K 37/02; B60K 2370/1534; B60K 2370/171; B60K 2370/52; B60K 2370/5899; B60K 2370/592; B60K 2370/169; B60K 2370/174; B60K 35/00; B60Y 2200/91; B60Y 2200/92; B60Y 2300/00; H04W 4/40; Y02T 10/72; Y02T 90/16; Y02T 10/70; Y02T 10/7072; Y02T 10/84; Y02T 90/14; B60Q 9/00
  See application file for complete search history.

(56) References Cited

U.S. PATENT DOCUMENTS

2007/0112475 A1\* 5/2007 Koebler ............. G01C 21/3617
  701/1
2008/0052145 A1\* 2/2008 Kaplan .................. B60L 53/63
  705/7.31

FOREIGN PATENT DOCUMENTS

| CN | 108394295 | 8/2018 |
| JP | 2013-172476 | 9/2013 |
| JP | 2014-054083 | 3/2014 |
| JP | 2015-162991 | 9/2015 |
| JP | 2016-205917 | 12/2016 |

OTHER PUBLICATIONS

Chinese Office Action for Chines Patent Application No. 201910880136.9 dated Aug. 31, 2022.

\* cited by examiner

PRESENTATION DEVICE, PRESENTATION METHOD, AND STORAGE MEDIUM

CROSS-REFERENCE TO RELATED APPLICATION

Priority is claimed on Japanese Patent Application No. 2018-186555, filed Oct. 1, 2018, the content of which is incorporated herein by reference.

BACKGROUND

Field of the Invention

The present invention relates to a presentation device, a presentation method, and a storage medium.

Description of Related Art

There are electric vehicles equipped with a motor for traveling and hybrid vehicles that include a motor for traveling and an engine. A motor with which a vehicle is equipped is driven by the power supplied from a battery such as a secondary battery. A secondary battery has problems such as reduction in an amount of charge due to deterioration. However, if accuracy in detection of the degree of deterioration of a secondary battery is low, it is difficult to find problems such as reduction in the amount of charge. Therefore, there is a technology of accurately determining the degree of deterioration of a secondary battery (for example, Japanese Unexamined Patent Application, First Publication No. 2015-162991).

SUMMARY

However, even if the degree of deterioration of a battery can be accurately determined, a cause of deterioration of the battery may not be able to be referred to. For this reason, it is difficult to recognize a manner of use of a battery in which deterioration is suppressed when the battery is intentionally used to suppress deterioration on the basis of the degree of deterioration of the battery.

Aspects of the present invention are made in view of such circumstances, and an object thereof is to provide a presentation device, a presentation method, and a storage medium that can allow a user to recognize specific measures for suppressing deterioration of a battery.

The presentation device, the presentation method, and the storage medium according to the present invention have adopted the following configurations.

(1): According to one aspect of the present invention, a presentation device includes an acquirer configured to acquire a usage status of a secondary battery which is the usage status of a secondary battery with which a plurality of vehicles including a target vehicle are equipped and includes one or more items, a deriver configured to derive representative values of items of the secondary battery in a vehicle in a predetermined area, and a presenter configured to present a relationship of the items of the usage status of the secondary battery with which the target vehicle is equipped with respect to the representative values derived by the deriver.

(2): In the aspect of (1) described above, an advice information generator configured to generate deterioration suppression advice information of a secondary battery with which the target vehicle is equipped on the basis of the relationship of the items of the usage status of the secondary battery with which the target vehicle is equipped with respect to the representative values is further included, and the presenter is configured to present the deterioration suppression advice information.

(3): In the aspect of (1) described above, the deriver is configured to derive representative values of items of secondary batteries with which the same type of vehicles are equipped.

(4): In the aspect of (1) described above, the deriver is configured to derive representative values of items of the same type of secondary batteries with which the same type of vehicles are equipped.

(5): In the aspect of (1) described above, the deriver is configured to derive representative values of items of the same type of secondary batteries with which vehicles whose total travel distances are within a predetermined range are equipped.

(6): In the aspect of any one of (1) described above, the presenter is configured to present the relationship of the items of the usage status of the secondary battery to a user of the target vehicle by causing a display provided in the target vehicle to display the relationship of the items of the usage status of the secondary battery.

(7): In the aspect of (1) described above, the presenter does not present the relationship of the items of the usage status of the secondary battery with which the target vehicle is equipped to a user of the target vehicle when the representative values of items of the secondary battery in the vehicle within the predetermined area cannot be derived.

(8): In the aspect of (1) described above, when the representative values of the items of the secondary battery in the vehicle within the predetermined area cannot be acquired, the presenter is configured to present the relationship of the items of the usage status of the secondary battery with which the target vehicle is equipped with respect to assumed representative values assumed in advance as the representative values of the items of the secondary battery in the vehicle within the predetermined area to the user of the target vehicle.

(9): According to another aspect of the present invention, a presentation method includes, by a computer, acquiring a usage status of a secondary battery which is a usage status of a secondary battery with which a plurality of vehicles including a target vehicle are equipped and includes one or more items, deriving representative values of items of the secondary battery in a vehicle within a predetermined area, and presenting a relationship of items of the usage status of the secondary battery with which the target vehicle is equipped with respect to the derived representative values to a user of the target vehicle.

(10): According to still another aspect of the present invention, a storage medium is configured to store a program that causes a computer to acquire a usage status of a secondary battery that is a usage status of a secondary battery with which a plurality of vehicles including a target vehicle are equipped and includes one or more items, to derive representative values of items of the secondary battery in a vehicle within a predetermined area, and to present a relationship o s f items of the usage status of the secondary battery with which the target vehicle is equipped with respect to the derived representative values to a user of the target vehicle.

BRIEF DESCRIPTION OF THE DRAWINGS

According to (1) to (10), it is possible to cause a user to recognize specific measures to suppress deterioration of a battery.

DETAILED DESCRIPTION OF THE INVENTION

Hereinafter, embodiments of a presentation device, a presentation method, and a storage medium of the present invention will be described with reference to the drawings. In the following description, it is assumed that a vehicle 10 is an electric car, but the vehicle 10 may be a vehicle equipped with a secondary battery that supplies power for traveling, and may also be a hybrid car or a fuel cell vehicle. In the following description, it is assumed that a secondary battery and a battery are synonymous.

First Embodiment

[Overall Configuration]

Figure 1:
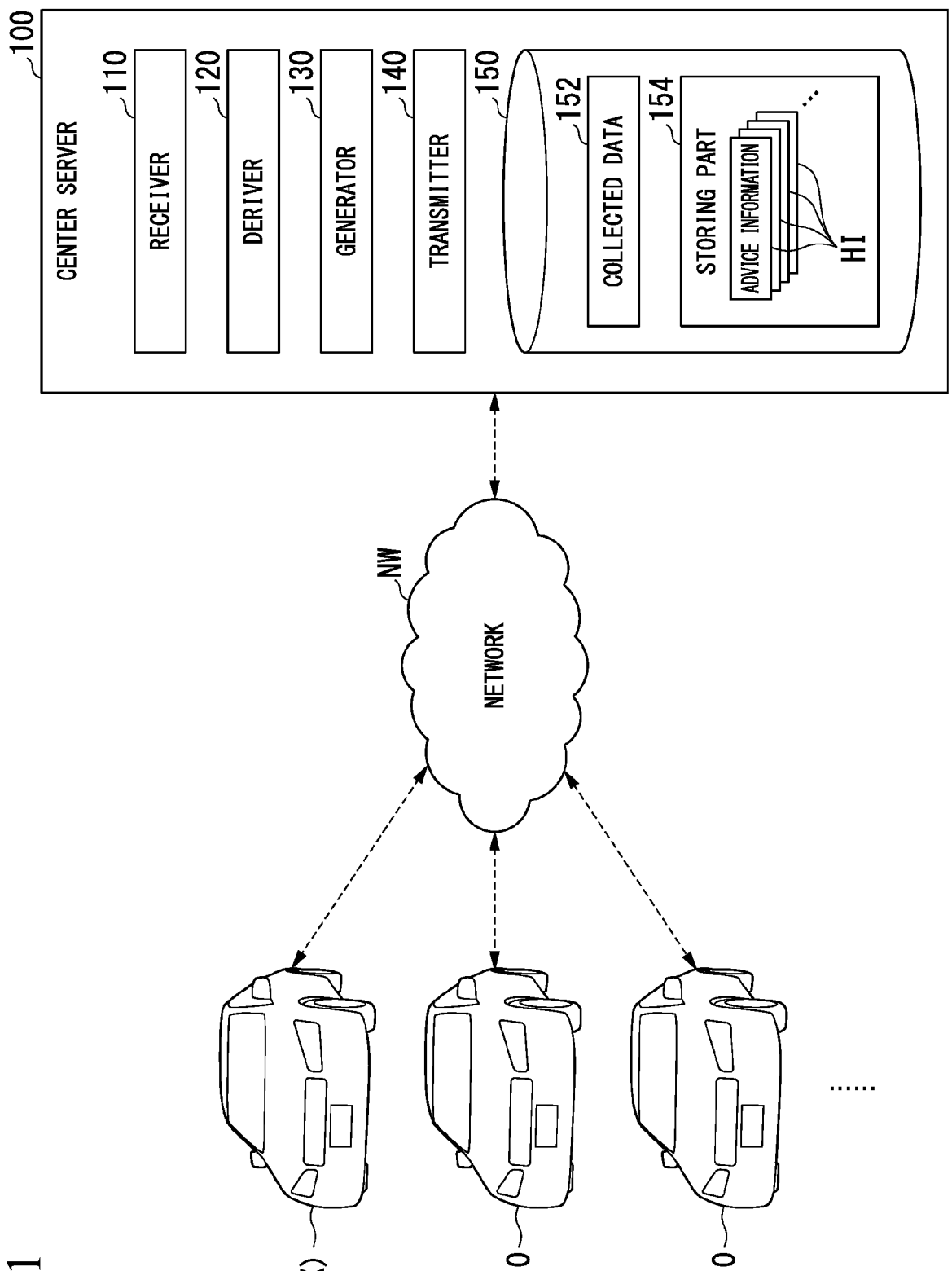
FIG. 1 is a diagram which shows a configuration example of a presentation system.

FIG. 1 is a diagram which shows a configuration example of a presentation system 1. As shown in FIG. 1, the presentation system 1 includes a plurality of vehicles 10 and a center server (an example of a presentation device) 100. The center server 100 examines a battery with which the vehicle 10 is equipped on the basis of information transmitted by the plurality of vehicles 10. The center server 100 obtains relationships (average values and deviations) with respect to representative values of one or more respective items of a usage status of a battery with which a vehicle 10X is equipped to be presented (hereinafter, referred to as a "target vehicle") on the basis of a result of the examination of the battery, and presents it to a user of the target vehicle 10X. The target vehicle 10X is one of the plurality of vehicles 10. The vehicle 10 and the center server 100 communicate with each other via the network NW. The network NW includes, for example, the Internet, a wide area network (WAN), a local area network (LAN), a provider device, a wireless base station, and the like.

[Vehicle 10]

Figure 2:
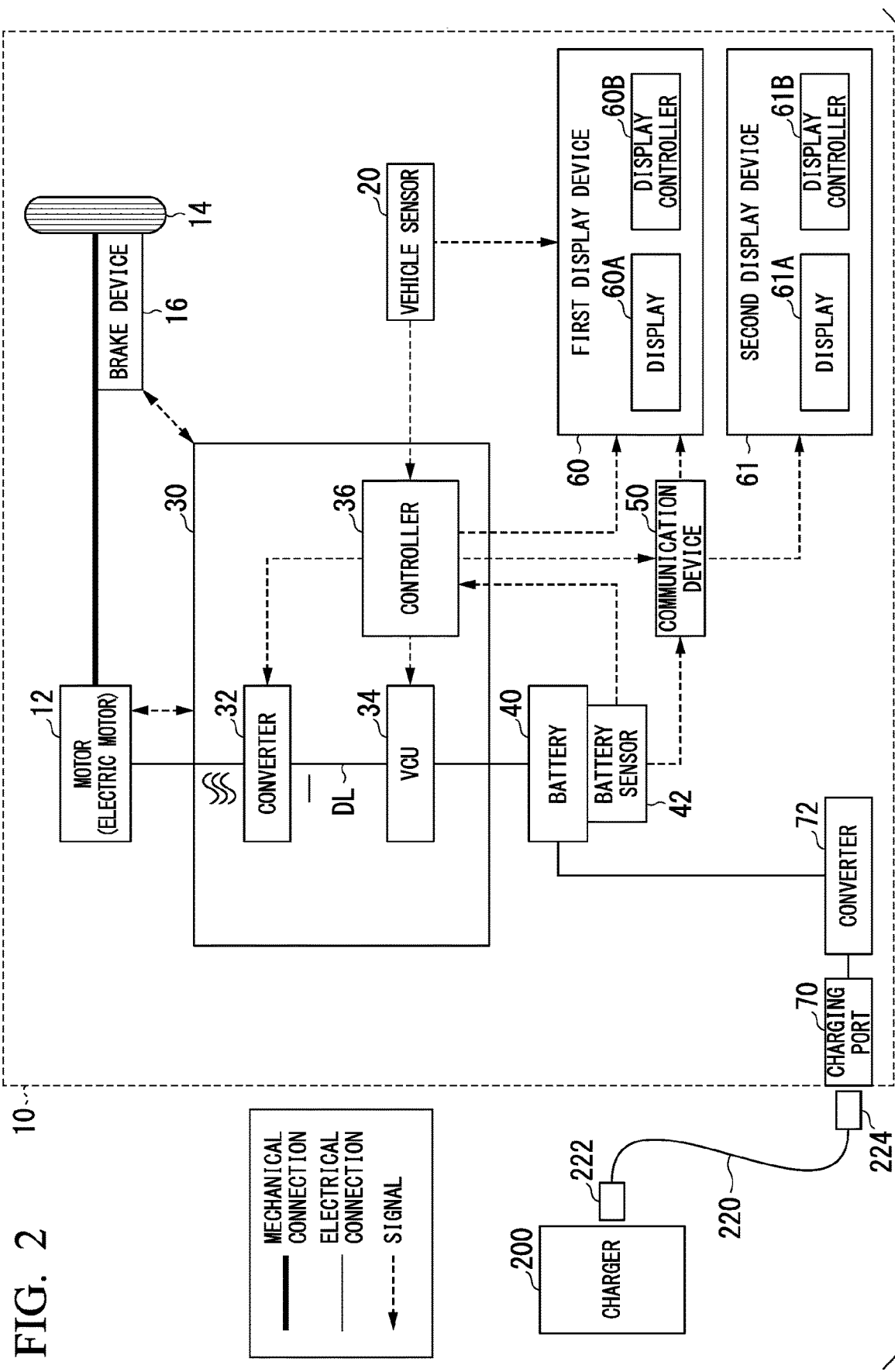
FIG. 2 is a diagram which shows an example of a configuration of a vehicle.
Figure 3:
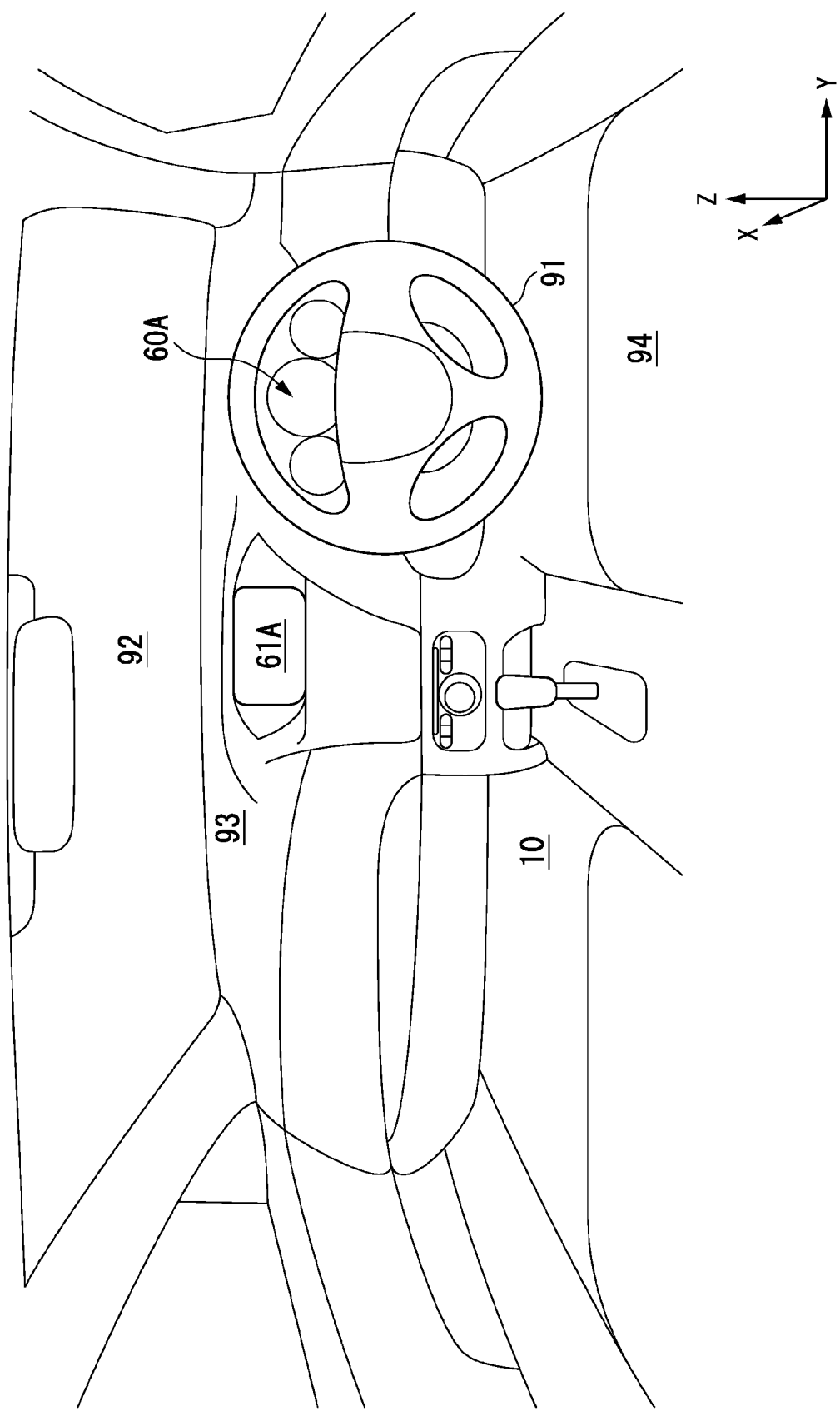
FIG. 3 is a view in which a configuration in a vehicle compartment of the vehicle is exemplified.

FIG. 2 is a diagram which shows an example of the configuration of the vehicle 10. As shown in FIG. 2, the vehicle 10 includes, for example, a motor 12, a driving wheel 14, a brake device 16, a vehicle sensor 20 a power control unit (PCU) 30, a battery 40, a battery sensor 42 such as a voltage sensor, a current sensor, and a temperature sensor, a communication device 50, a first display device 60, a second display device 61, a charging port 70, and a converter 72.

The motor 12 is, for example, a three-phase alternating current electric motor. A rotor of the motor 12 is coupled to the driving wheel 14. The motor 12 outputs power to the driving wheel 14 using the supplied power. The motor 12 generates electricity using a kinetic energy of a vehicle at the time of decelerating the vehicle.

The brake device 16 includes, for example, a brake caliper, a cylinder that transmits a hydraulic pressure to the brake caliper, and an electric motor that causes the cylinder to generate a hydraulic pressure. The brake device 16 may include a function of transmitting a hydraulic pressure generated by an operation of a brake pedal to the cylinder via a master cylinder as a backup. The brake device 16 is not limited to the configuration described above, and may also be an electronically controlled hydraulic pressure brake device that transmits the hydraulic pressure of the master cylinder to the cylinder.

The vehicle sensor 20 includes an accelerator opening sensor, a vehicle speed sensor, and a brake depression force sensor. The accelerator opening sensor is attached to an accelerator pedal, which is an example of an operator that receives an acceleration instruction by a driver, detects an operation amount of the accelerator pedal, and outputs it to the controller 36 and the first display device 60 as an accelerator opening. The vehicle speed sensor includes, for example, a speed calculator and a wheel speed sensor attached to each wheel, derives a speed of a vehicle (vehicle speed) by integrating wheel speeds detected by the wheel speed sensors, and outputs it to the controller 36 and the first display device 60. The brake depression force sensor is attached to a brake pedal, detects an operation amount of the brake pedal, and outputs it to the controller 36 and the first display device 60 as a brake depression force.

A PCU 30 includes, for example, a converter 32, a voltage control unit (VCU) 34, and a controller 36. It is a merely example to configure these components in one group such as the PCU 30, and these components may also be configured to be disposed in a distributed manner.

The converter 32 is, for example, an AC-DC converter. A direct current side terminal of the converter 32 is connected to a direct current link DL. The battery 40 is connected to the direct current link DL via the VCU 34. The converter 32 converts an alternating current generated by the motor 12 into a direct current and outputs it to the direct current link DL.

The VCU 34 is, for example, a DC-DC converter. The VCU 34 boosts the power supplied from the battery 40 and outputs it to the direct current link DL.

The controller 36 includes, for example, a motor controller, a brake controller, and a battery and VCU controller. The motor controller, the brake controller, and the battery and VCU controller may each be replaced with a separate control device, for example, a control device such as a motor ECU, a brake ECU, or a battery ECU.

The motor controller controls the motor 12 on the basis of an output of the vehicle sensor 20. The brake controller controls the brake device 16 on the basis of the output of the vehicle sensor 20 and calculates a travel load. The battery and VCU controller calculates a state of charge (SOC) of the battery 40 on the basis of an output of the battery sensor 42 attached to the battery 40, and checks a charge status of the battery 40. The battery and VCU controller checks the charge status of the battery 40 and counts the number of times of charging of the battery 40 by counting the number of times the battery 40 has received electricity. The controller 36 outputs the travel load calculated by the motor controller to the communication device 50. The controller 36 outputs the number of times of charging of the battery 40 counted by the battery and VCU controller to the communication device 50. The controller 36 outputs the SOC calculated by the battery and VCU controller to the VCU 34, the communication device 50, and the first display device 60. The VCU 34 raises a voltage of the direct current link DL in accordance with an instruction from the battery and VCU control.

The battery 40 is, for example, a secondary battery such as a lithium ion battery. The battery 40 stores power introduced from an external charger 200 of the vehicle 10, and performs a discharge for traveling of the vehicle 10. The battery sensor 42 includes, for example, a current sensor, a voltage sensor, and a temperature sensor. The battery sensor 42 detects, for example, a current value, a voltage value, and a temperature of the battery 40. The battery sensor 42 outputs the detected current value, voltage value, temperature, and the like to the controller 36 and the communication device 50.

The communication device 50 includes a wireless module for connection to a cellular network or a Wi-Fi network. The communication device 50 acquires a current value, a voltage value, and a temperature output by the battery sensor 42, and battery usage status information such as the number of times of charging, an SOC, and the like output by the controller 36, and transmits them to the center server 100 via the network NW.

The communication device 50 transmits battery type information, vehicle type information, and local information to the center server 100 as battery usage status information. The battery type information is information indicating a type of battery with which the vehicle 10 is equipped. The vehicle type information is information indicating a vehicle type of the vehicle 10. The local information is information indicating an area (a predetermined area) in which the vehicle 10 is present (stored). In addition, the communication device 50 receives information transmitted by the center server 100 via the network NW. The communication device 50 outputs the received information to the first display device 60.

The first display device 60 includes, for example, a display 60A and a display controller 60B. The display 60A displays information in accordance with control of the display controller 60B. The display controller 60B causes the display 60A to display a vehicle speed output by the vehicle sensor 20, an SOC output by the controller 36, and the like.

The second display device 61 includes, for example, a display 61A and a display controller 61B. The display 61A displays information in accordance with control of the display controller 61B. The display controller 61B causes the display 61A to display average values and deviations for respective items of the usage status of a battery in accordance with information output by the communication device 50.

The charging port 70 is provided toward outside of a vehicle body of the vehicle 10. The charging port 70 is connected to the charger 200 via a charging cable 220. The charging cable 220 includes a first plug 222 and a second plug 224. The first plug 222 is connected to the charger 200, and the second plug 224 is connected to the charging port 70. Electricity supplied from the charger 200 is supplied to the charging port 70 via the charging cable 220.

The charging cable 220 includes a signal cable attached to a power cable. The signal cable relays communication between the vehicle 10 and the charger 200. Therefore, a power connector and a signal connector are provided in each of the first plug 222 and the second plug 224.

The converter 72 is provided between the battery 40 and the charging port 70. The converter 72 converts current introduced from the charger 200 via the charging port 70, for example, alternating current, into direct current. The converter 72 outputs the converted direct current to the battery 40.

FIG. 2 is a view in which a configuration in a vehicle compartment of the vehicle 10 is exemplified. As shown in FIG. 2, the vehicle 10 is provided with, for example, a steering wheel 91 that controls steering of a vehicle M, a front windshield 92 that separates the outside of a vehicle and the inside of a vehicle compartment, and an instrument panel 93. The front windshield 92 is a member having light transmission.

The display 60A of the first display device 60 is provided in the vicinity of a front of a driver's seat 94 in the instrument panel 93 in the vehicle compartment. The display 60A is provided at a position at which it can be visually recognized from a gap in the steering wheel 91 or over the steering wheel 91 by the driver.

A second display device 61 is provided at the center of the instrument panel 93. The display 61A of the second display device 61 displays the average values and deviations of respective items of the usage status of a battery. In addition, the display 61A, for example, displays an image corresponding to navigation processing executed by a navigation device (not shown) with which the vehicle 10 is equipped or displays a video of another party in a videophone. The display 61A may display a video program, reproduce a DVD, or display content of a downloaded movie and the like.

[Center Server 100]

Back to FIG. 1, the center server 100 includes, for example, a receiver (acquirer) 110, a deriver 120, a generator (advice information generator) 130, a transmitter (presenter) 140, and a storage 150. The deriver 120 and the generator 130 are realized by, for example, a hardware processor such as a central processing unit (CPU) executing a program (software). Some or all of these components may be realized by hardware (circuit unit: including circuitry) such as a large scale integration (LSI), an application specific integrated circuit (ASIC), a field-programmable gate array (FPGA), or a graphics processing unit (GPU), or may be realized by a cooperation of software and hardware. The program may be stored in a storage device (a storage device including non-transitory storage medium) such as a hard disk drive (HDD) or a flash memory in advance, and may be installed by being stored in a detachable storage medium (a non-transitory storage medium) such as a DVD or a CD-ROM and the storage medium with which a drive device is equipped. The storage 150 is realized by the storage device described above.

The receiver 110 receives battery usage status information such as a current value, a voltage value, a temperature, an SOC, the number of times of charging, and a travel load of a battery transmitted from the plurality of vehicles 10, respectively. The receiver 110 causes the storage 150 to store the received battery usage status information as the collected data 152 for each type of identification information of the vehicle 10 (for example, license plate information, communication identification information of the communication device 50, or registered identification information of a user). The collected data 152 includes battery type information, vehicle type information, and local information.

On the premise that processing by the center server 100 is performed, the plurality of vehicles 10 detect a current value, a voltage value, a temperature, and the like of the battery 40 using the battery sensor 42, respectively, and acquire battery usage status information. The vehicle 10 transmits the acquired battery usage status information to the center server 100 from the communication device 50. The vehicle 10 may transmit the battery usage status information at predetermined times, for example, every one hour or every day, and may also transmit it on the basis of an instruction of a user of the vehicle 10. The vehicle 10 may transmit the battery usage status information in accordance with a request of the center server 100. The vehicle 10 may transmit the battery usage status information when a predetermined condition is satisfied, for example, when a battery load exceeds a certain amount or when an amount of increase in battery load from a previous transmission reaches a certain amount. The vehicle 10 may transmit the battery usage status information at any one or more of these timings.

The deriver 120 calculates and acquires a battery capacity on the basis of the current value, voltage value, and temperature of a battery among the collected data 152 stored in the storage 150. The deriver 120 calculates the average SOC of each battery on the basis of the SOC among the collected data 152. The deriver 120 includes the calculated battery capacity and average SOC in the collected data 152 and causes the storage 150 to store it.

The deriver 120 selects the collected data 152 on the basis of the local information included in the collected data 152 stored in the storage 150. The deriver 120 may select the collected data 152 for each area on the basis of the local information, and also selects it on the basis of other information. For example, the deriver 120 may further select the collected data 152 of the same type of batteries on the basis of the battery type information, and may further select the collected data 152 of the same type (the same model) of vehicles on the basis of the vehicle type information after selecting the collected data 152 on the basis of area data. Alternatively, the deriver 120 may select the collected data 152 by combining these types of information. In the following description, a case in which the deriver 120 selects the collected data 152 for each area on the basis of the local information will be described.

The deriver 120 calculates and derives the average values of respective items on the basis of the collected data 152 for each selected area. Specifically, the deriver 120 calculates and derives the average values of the battery capacity, temperature, travel load, average SOC, and the number of times of charging of the battery 40 with which the plurality of vehicles 10 are equipped.

The deriver 120 calculates the average values of respective items, and derives the deviations of respective items of the battery usage status information of the battery (hereinafter, referred to as a "target battery") with which the target vehicle 10X in an area including the target vehicle 10X is equipped. Specifically, the deviation (a difference from the average value) of respective items is derived by comparing values of the battery capacity, the temperature, the travel load, the average SOC, and the number of times of charging obtained from the battery usage status information transmitted by the target vehicle 10X with the average values of these respective items. The deriver 120 outputs the derived average values and deviation to the generator 130.

The generator 130 reads advice information HI corresponding to the deviations of respective items of a target battery from the storage 150 on the basis of the deviations of respective items of the target battery and the average values of respective items derived by the deriver 120. Here, the advice information HI stored in the storage 150 will be described.

The storage 150 includes a storing part 154 that stores a plurality of pieces of advice information HI. Each of the plurality of types of advice information HI stored in the storing part 154 is, for example, information for suppressing a progress in deterioration of the battery 40. Each of the plurality of pieces of advice information HI shows measures for suppressing deterioration of the battery 40 (deterioration suppression advice information) when respective items of the battery usage status information indicate that deterioration of the battery 40 is in progress. The advice information HI is provided in accordance with the deviations of respective items of the battery usage status information.

The generator 130 selects the advice information HI of content to be advised to cause an opposite effect to that of factors that cause deterioration to progress. The factors that cause deterioration to progress are specifically respective items of the battery usage status information such as the battery temperature, the travel load, the average SOC, and the number of times of charging. The deterioration of the battery 40 is likely to progress when the deviations of respective items of the battery usage status information are large in a positive direction. The generator 130 selects the advice information HI of content to be advised such that the deviation of each of these items is directed in a negative direction when respective items of the battery usage status information indicate that the deterioration of the battery 40 is likely to progress.

For example, when the deviation of the battery temperature is large in the positive direction, the deterioration of the battery 40 is likely to progress. The content of the advice information HI herein is, for example, content indicating that "there is a usage that increases the battery temperature and causes deterioration of the battery to progress. Please keep the vehicle indoors and lower the battery temperature."

The advice information HI stored in the storing part 154 of the storage 150, when a usage status of the battery is good, includes information to be advised such that the current usage status is maintained or becomes better. The generator 130 selects the advice information HI to be advised such that the current usage status is maintained or becomes better when respective items of the battery usage status information are close to the average values or smaller than the average values.

The generator 130 outputs the average values of respective items, the deviations of respective items of the target battery, and the advice information derived by the deriver 120 to the transmitter 140. The transmitter 140 transmits the output average values of respective items, deviations of respective items of the target battery, and advice information to the target vehicle 10X and presents them to a user of the target vehicle 10X via the target vehicle 10X.

Figure 4:
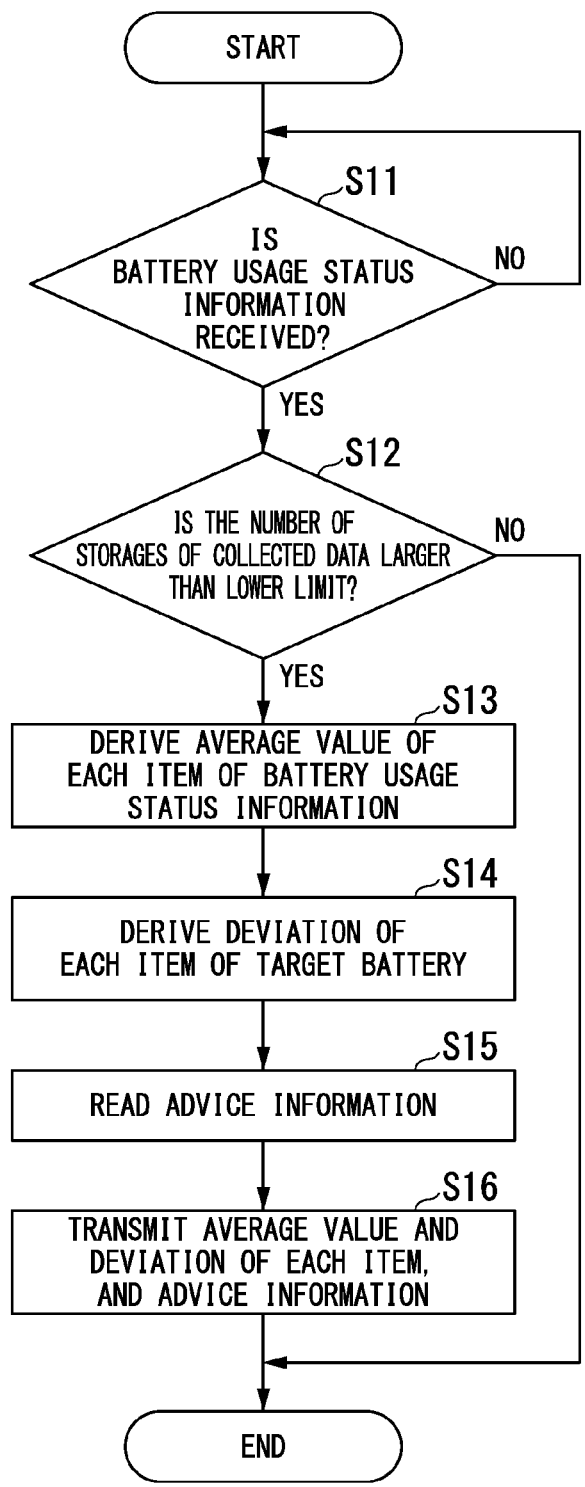
FIG. 4 is a flowchart which shows an example of a flow of processing executed by each unit of the center server.

Next, processing in the center server 100 will be described in detail. FIG. 4 is a flowchart which shows an example of a flow of processing executed by each unit of the center server 100.

The center server 100 first determines whether the receiver 110 has received the battery usage status information transmitted by the target vehicle 10X (step S11). Until the receiver 110 receives the battery usage status information (NO in step S11), the center server 100 repeats the processing of step S11.

When it is determined that the receiver 110 has received the battery usage status information (YES in step S11), the center server 100 causes the storage 150 to store the received battery usage status information as the collected data 152. The center server 100 determines whether the number of storages of the collected data 152 stored in the storage 150 exceeds a lower limit (step S12). The lower limit of the number of storages of the collected data 152 is the number of data required to calculate the average values of respective items of the battery usage status information, and it can be set as an appropriate number. As the number of storages of the collected data 152 increases, the center server 100 can derive the deviations of respective items of the usage status information of the target battery with high accuracy. For this reason, the center server 100 may set the number of data which can derive the deviation with predetermined accuracy as the lower limit of the number of storages of the collected data 152. Once the number of storages of the collected data 152 exceeds the lower limit, the determination processing in step S12 may be omitted.

It may also be determined whether the number of receptions in the same area exceeds the lower limit with reference to local information included in the battery usage status information before determining the lower limit of the number of storages of the collected data 152.

When it is determined that the number of storages of the collected data 152 does not exceed the lower limit (NO in step S12), the center server 100 ends the processing. When it is determined that the number of storages of the collected data 152 exceeds the lower limit (YES in step S12), the center server 100 causes the deriver 120 to derive the average values of respective items (the battery capacity, the battery temperature, the number of times of charging, the average SOC) of the battery usage status information (step S13).

In the derivation of the average values of respective items of the battery usage status information, the deriver 120 selects the collected data 152 including the same local information as local information included in the battery usage status information received in step S11 among the collected data 152 stored in the storage 150. The deriver 120 may select the collected data 152 on the basis of the battery type information or the vehicle type information in addition to the local information, and may select the collected data 152 on the basis of the battery type information and the vehicle type information. In the selection of the local information, the same area may be set as a reference, or a neighboring area including the same area may also be set. For example, the deriver 120 may select the collected data 152 including the battery type information the same as the collected data 152 of the target battery, and may select the collected data 152 including the battery type information and the vehicle type information the same as the collected data 152 of the target battery. The deriver 120 calculates and derives the average values of respective items of the battery usage status information included in the selected collected data 152.

The deriver 120 compares the derived average values with respective items of the battery usage status information received by the receiver 110 in step S11, and derives the deviations of respective items of the battery usage status information of the target battery (step S14). The deriver 120 outputs both the derived deviations of respective items of the battery usage status information and the average values of respective items of the battery usage status information to the generator 130.

The center server 100 causes the generator 130 to select and read the advice information HI in accordance with the deviations of respective items of the battery usage status information output by the deriver 120 from the storing part 154 of the storage 150 (step S15). For example, when the deviations of the battery temperature and the average SOC among the deviations of respective items of the output battery usage status information are large data in the positive direction, the generator 130 reads the advice information HI for lowering the battery temperature and decreasing the average SOC. The generator 130 outputs the read advice information HI together with the average values and deviations of respective items of the battery usage status information output by the deriver 120 to the transmitter 140.

Thereafter, the center server 100 causes the transmitter 140 to transmit the average values and deviations of respective items of the battery usage status information output by the generator 130, and the advice information to the target vehicle 10X (step S16), and ends the processing.

The target vehicle 10X, in the communication device 50 shown in FIG. 1, receives the advice information and the average values and deviations of respective items of the battery usage status information transmitted from the center server 100. The communication device 50 outputs the advice information and the average values and deviations of respective items of the battery usage status information, which are received, to the second display device 61. The display controller 61B of the second display device 61 causes, for example, the display 61A to display the average values and deviations of respective items of the battery usage status information and the advice information. The communication device 50 may output the average values and deviations of respective items of the battery usage status information and the advice information, which are received, to the first display device 60. In this case, the display controller 60B of the first display device 60 causes, for example, the display 60A to display the average values and deviations of respective items of the battery usage status information and the advice information.

Figure 5:
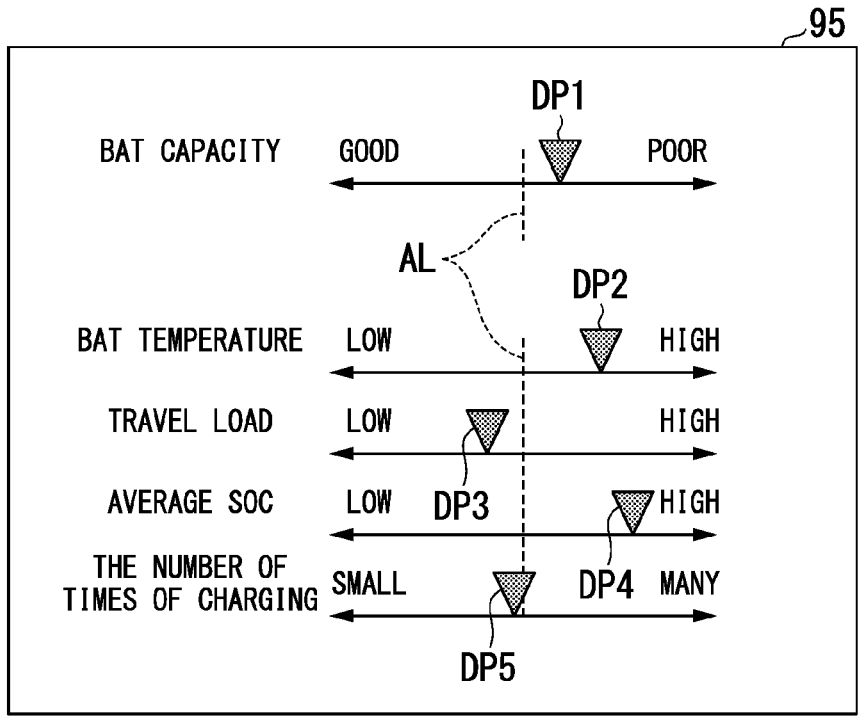
FIG. 5 is a diagram which shows a battery status presentation screen.

FIG. 5 is a diagram which shows a battery status presentation screen. As shown in FIG. 5, the display 61A displays a battery status presentation screen. The display 61A displays and presents the average values and deviations of respective items such as the battery capacity (BAT capacity), the battery temperature (BAT temperature), the travel load, the average SOC, and the number of times of charging, which are battery usage status information, on a battery status presentation screen.

The display 61A displays a graph on a right side of each of these items, and displays a line AL indicating an average value in the center of the graph. Furthermore, a first deviation point DP1 to a fifth deviation point DP5 indicating the deviations of respective items are shown in the graphs of respective items. A first deviation point DP1 indicates the deviation of the battery capacity. A second deviation point DP2 indicates the deviation of the battery temperature. A third deviation point DP3 indicates the deviation of the travel load. A fourth deviation point DP4 indicates the deviation of the average SOC. A fifth deviation point DP5 indicates the deviation of the number of times of charging.

In the example shown in FIG. 5, the battery temperature and the average SOC among respective items of the battery usage status information are much higher than the average values. For this reason, the battery capacity becomes worse than the average value. The number of times of charging substantially becomes the average value and the travel load is lower than the average value.

Figure 6:
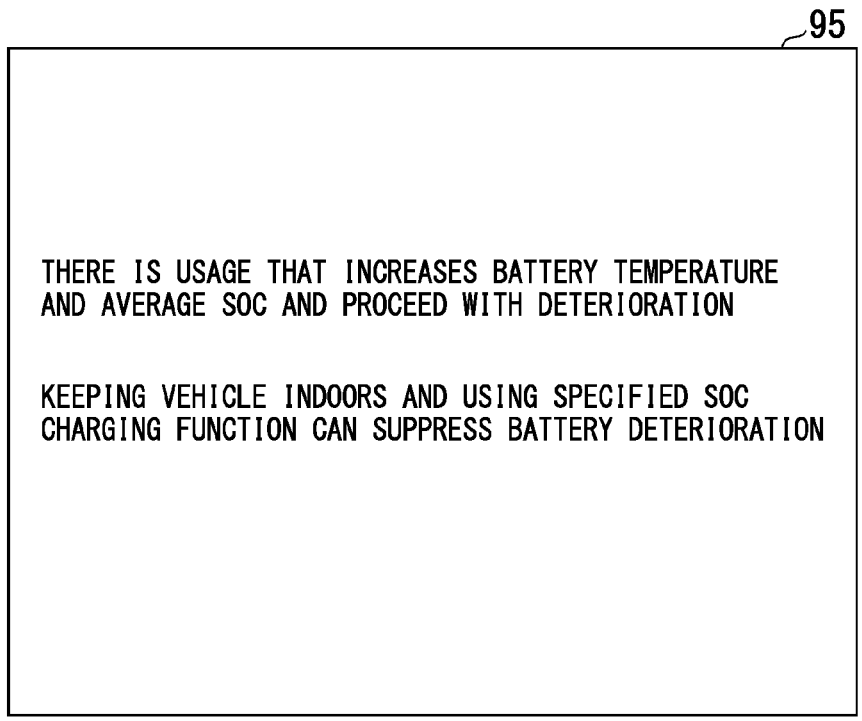
FIG. 6 is a diagram which shows an advice presentation screen.

FIG. 6 is a diagram which shows an advice presentation screen. For example, the display 61A displays an advice presentation screen shown in FIG. 6 instead of the battery status presentation screen shown in FIG. 5 by operating a screen change switch (not shown) which is provided in the vicinity of the driver's seat 94. Here, since the battery temperature and the average SOC among respective items of the battery usage status information are high, an advice of content shown in FIG. 6 is displayed and presented.

As described above, according to the described embodiment, the deriver 120 of the center server 100 derives the average values of respective items of the usage status of a battery with which a plurality of vehicles in an area in which the target vehicle is present are equipped. Here, the deviations of the usage status of the target battery are derived from the derived average values of respective items of the usage status of a battery, and the derived deviations are presented. For this reason, in comparison with the usage status of a battery with which other vehicles in an area are equipped, a user of the target vehicle can present superiority or inferiority of respective items of the usage status of the battery. Therefore, the user can recognize an item to be improved to suppress the deterioration of a battery among the usage status of the battery. Therefore, it is possible to cause the user to recognize specific measures for suppressing the deterioration of a battery.

In the embodiment described above, an advice for suppressing the deterioration of a battery is performed. For this reason, the user can easily and accurately recognize specific measures for suppressing the deterioration of a battery.

Second Embodiment

Figure 7:
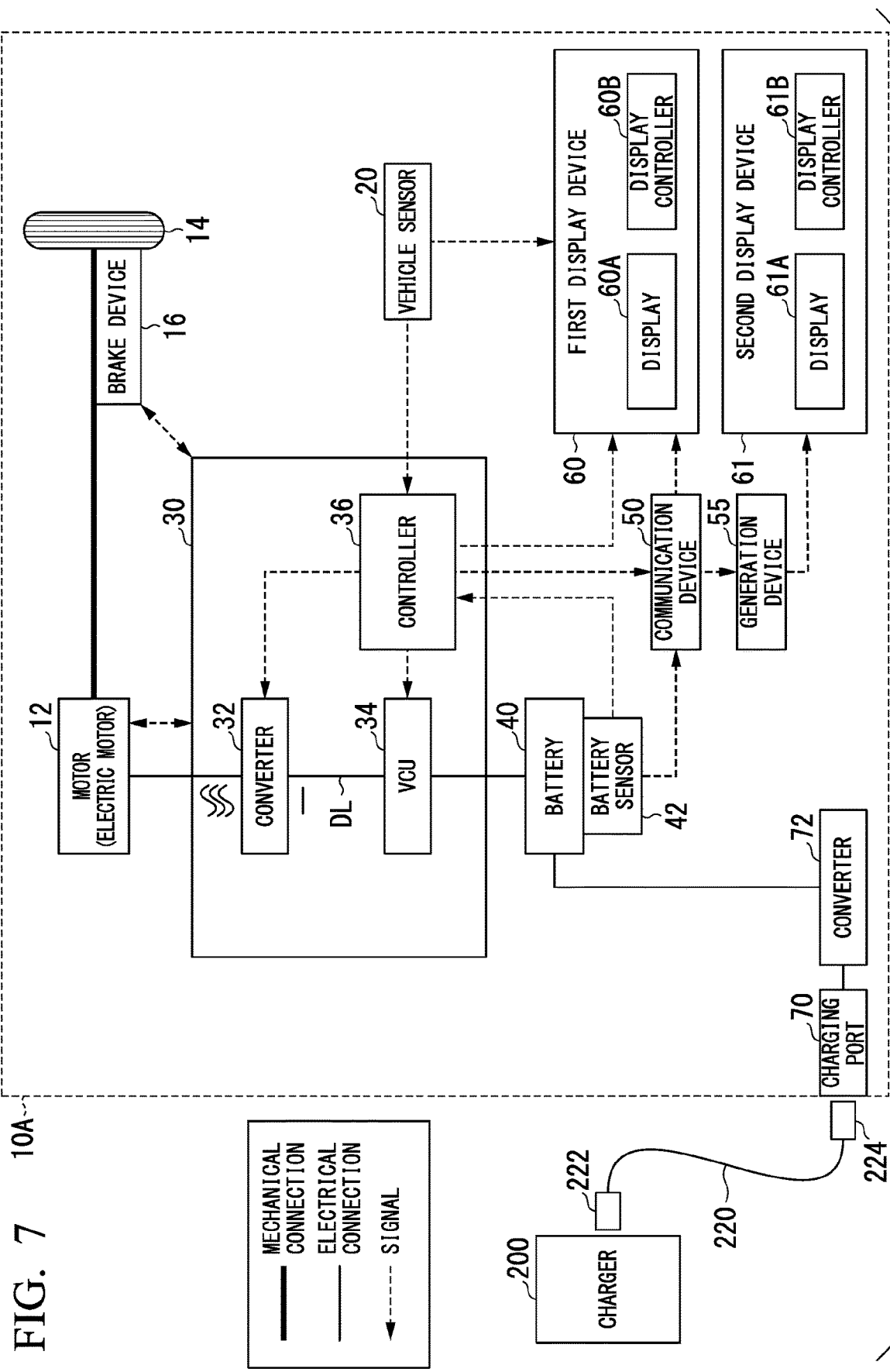
FIG. 7 is a diagram which shows an example of a configuration of a vehicle according to a second embodiment.

Next, a second embodiment will be described. FIG. 7 is a diagram which shows an example of a configuration of a vehicle 10A according to the second embodiment. The configuration of the second embodiment is different from the configuration of the first embodiment in that a component having the same function as the generator 130 provided in the center server 100 is provided as a generation device 55 in the vehicle 10A. It is approximately the same as the configuration of the first embodiment in the other points. Hereinafter, processing in the second embodiment, focusing on a difference from the first embodiment, will be described below.

The generation device 55 includes a generator having the same configuration as the generator 130 of the first embodiment, and a storage having the same configuration as the storage 150. The storage of the generation device 55 stores a plurality of pieces of advice information. In the second embodiment, the center server 100 transmits the average values and deviations of respective items of the battery usage status information derived by the deriver 120 to the vehicle 10A via the transmitter 140. The vehicle 10A receives the transmitted average values and deviations of respective items of the battery usage status information using the communication device 50, and outputs them to the generation device 55. The generation device 55 selects and reads advice information to be displayed on the display 61A of the second display device 61 from the advice information stored in the storage on the basis of the average values and deviations of respective items of the battery usage status information output by the communication device 50. The generation device 55 outputs the read advice information together with the average values and deviations of respective items of the battery usage status information output by the communication device 50 to the second display device 61. The second display device 61 causes the display 61A to display the battery status presentation screen shown in FIG. 5 and the advice presentation screen shown in FIG. 6 on the basis of the average values and deviations of respective items of the battery usage status information and the advice information, which are output.

According to the second embodiment described above, like the first embodiment, the user can recognize an item to be improved to suppress the deterioration of a battery among the usage status of the battery. Therefore, it is possible to cause the user to recognize specific measures for suppressing the deterioration of a battery. In the second embodiment, advice information is generated in the target vehicle 10X. For this reason, an amount of communication between the center server 100 and the target vehicle 10X can be reduced.

The average values are used as a "representative value" in each embodiment described above, but the "representative value" may be other than the average values, and may be, for example, a mode, a median, or the like. In each of the embodiments described above, the center server 100 derives the average values of respective items of the battery usage status information and the deviations of respective items of the battery usage status information, but at least one of these average values and deviations may be derived in the vehicle 10. When the average values of respective items of the battery usage status information are derived in the vehicle 10, for example, the center server 100 may transmit a plurality of pieces of collected data 152 to the vehicle 10. When the deviations of respective items of the battery usage status information of the target battery in the vehicle 10 is derived, the center server 100 may derive the average values of respective items of the battery usage status information and transmit them to the vehicle 10.

In each embodiment described above, "presentation" of a degree of relative deterioration is performed via the display 61A of the second display device 61 with which the target vehicle 10X is equipped, but it may be performed in other aspects. For example, "presentation" may be performed by being displayed on the display 60A of the first display device 60 or a display of an information terminal (a portable terminal) owned by the user, and "presentation" may also be performed by emitting a voice from a speaker of the target vehicle 10X or the information terminal.

In each of the embodiments described above, the deriver 120 derives, for example, representative values such as average values of the battery capacity, temperature, travel load, average SOC, and the number of times of charging, but may also derive representative values of items of the same type of batteries with which vehicles whose total travel distances are within a predetermined range are equipped. The vehicles whose total travel distances are within a predetermined range refer to vehicles which have set respective ranges of 0 to 1000 km, 1001 to 3000 km, 3001 to 5000 km, 5001 to 10000 km, 10001 km or more, and whose total travel distances are within these ranges. In this case, vehicles are divided according to the total travel distance and representative values of items of batteries of vehicles in each divided range may be derived.

In the embodiment described above, it is not assumed that the deriver 120 cannot obtain the representative values of respective items of a battery, but when the deriver 120 cannot obtain the representative values of respective items of a battery, the transmitter 140 may not present the representative values of respective items of a battery and the deviations of respective items of a target battery to the user of the target vehicle 10X. The deriver 120 may assume and store assumed representative values as the representative values of items of the secondary battery in a vehicle within a predetermined area. The deriver 120 may present the assumed representative values and the deviations of respective items of a target battery to the user of the target vehicle 10X when the representative values of respective items of a battery cannot be obtained. The assumed representative values can be appropriately set. As the assumed representative values, for example, representative values derived in another area having an approximate environment may be used, and representative values obtained as a result of performing simulation and the like with reference to environmental conditions and the like in a predetermined area may also be set as the assumed representative values.

As described above, although description of modes for implementing the present invention is performed using embodiments, the present invention is not limited to these embodiments, and various modifications and substitutions can be made within a range not departing from the gist of the present invention.

What is claimed is:

1. A presentation device comprising:
   an acquirer configured to acquire usage statuses of secondary batteries with which a plurality of vehicles including a target vehicle are equipped, wherein the usage statuses comprise items defining the usage statuses;
   a deriver configured to derive representative values of the items of the usage status of the secondary battery from a vehicle, of the plurality of vehicles, in a predetermined area; and
   a presenter configured to present, to a user of the target vehicle, a relationship of the items of the usage status of the secondary battery with which the target vehicle is equipped with respect to the representative values derived by the deriver, by causing a display provided in the target vehicle to display the relationship.

2. The presentation device according to claim 1, further comprising:
   an advice information generator configured to generate deterioration suppression advice information of the secondary battery with which the target vehicle is equipped on the basis of the relationship with respect to the representative values,
   wherein the presenter is configured to present the deterioration suppression advice information.

3. The presentation device according to claim 1,
   wherein the deriver is configured to derive representative values of items of secondary batteries, of the secondary batteries, with which vehicles of a same type are equipped.

4. The presentation device according to claim 1,
   wherein the deriver is configured to derive representative values of items of secondary batteries of a same type, of the secondary batteries, with which vehicles of a same type, of the plurality of vehicles, are equipped.

5. The presentation device according to claim 1,
   wherein the deriver is configured to derive representative values of items of secondary batteries of a same type, of the secondary batteries, with which vehicles, of the plurality of vehicles, whose respective total travel distances are within a predetermined range, are equipped.

6. The presentation device according to claim 1,
   wherein the presenter does not present the relationship of the items, of the usage status of the secondary battery with which the target vehicle is equipped, to a user of the target vehicle when the representative values of the items, of the secondary battery in the vehicle within the predetermined area, cannot be derived.

7. The presentation device according to claim 1,
   wherein, when the representative values of the items, of the secondary battery in the vehicle within the predetermined area, cannot be acquired, the presenter is configured to present, to the user of the target vehicle, the relationship of the items, of the usage status of the secondary battery with which the target vehicle is equipped, with respect to assumed representative values, assumed in advance, as the representative values of the items of the secondary battery in the vehicle within the predetermined area.

8. A presentation method comprising:
   by a computer, acquiring usage statuses of secondary batteries with which a plurality of vehicles including a target vehicle are equipped, wherein the usages statuses comprise items;
   deriving representative values of the items of the secondary battery in a vehicle, of the plurality of vehicles, within a predetermined area;
   presenting, to a user of the target vehicle, a relationship of the items of the usage status of the secondary battery with which the target vehicle is equipped with respect to the derived representative values, by causing a display provided in the target vehicle to display the relationship.

9. A storage medium which is configured to store a program that causes a computer to:
   acquire usage statuses of secondary batteries which a plurality of vehicles including a target vehicle are equipped, wherein the usage statuses comprise items;
   derive representative values of the items of the secondary battery in a vehicle, of the plurality of vehicles, within a predetermined area;
   present, to a user of the target vehicle, a relationship of the items of the usage status of the secondary battery with which the target vehicle is equipped with respect to the derived representative values, by causing a display provided in the target vehicle to display the relationship.

* * * * *